United States Patent [19]

Douglas

[11] Patent Number: 5,333,725
[45] Date of Patent: Aug. 2, 1994

[54] FOLDABLE FRAMEWORK FOR BELT CONVEYOR

[76] Inventor: Patrick J. Douglas, No. 2 School Lane Santon, Isle of Man, United Kingdom

[21] Appl. No.: 88,990

[22] Filed: Jul. 2, 1993

Related U.S. Application Data

[63] Continuation of Ser. No. 861,972, filed as PCT/GB90/02013, Feb. 21, 1990, abandoned.

[30] Foreign Application Priority Data

Dec. 22, 1989 [GB] United Kingdom ............... 8929011

[51] Int. Cl.⁵ ............................................. B65G 21/10
[52] U.S. Cl. .................................. 198/632; 198/861.2
[58] Field of Search .................. 198/313, 632, 861.2; 414/523, 528; 198/861.2

[56] References Cited

U.S. PATENT DOCUMENTS

| | | | |
|---|---|---|---|
| 2,107,682 | 2/1938 | Wall | 414/523 |
| 4,072,242 | 2/1978 | Cook | 414/523 |
| 4,160,501 | 7/1979 | Johansen | 198/313 |
| 4,232,775 | 11/1980 | Duncan | 198/313 |
| 4,981,204 | 1/1991 | Smith | 198/632 |
| 5,044,448 | 9/1991 | Douglas | 198/632 |
| 5,086,911 | 2/1992 | Douglas | 198/632 |

FOREIGN PATENT DOCUMENTS 1057225 6/1979 Canada .
0338752 10/1989 European Pat. Off. .
2545068 11/1984 France .

*Primary Examiner*—Joseph E. Valenza
*Attorney, Agent, or Firm*—Workman, Nydegger & Jensen

[57] ABSTRACT

A foldable framework for supporting a belt conveyor which comprises a fixed sloping support frame (1,2), a movable support frame (4,5) connected to an upper end of the fixed frame with a first universal type connection (3), and a support leg (6) connected at its lower end to the fixed frame (1,2) with a second universal type connection (9) and connected at its upper end to the movable frame (4,5). A power-operated device (8) is connected between the support leg (6) and the movable frame (4,5). The power-operated device is operative to cause the movable frame (4,5) to pivot about the first universal type connection (3) between an operative conveyor-support position and a laterally displaced, inoperative position suitable for storage and transport of the framework and any conveyor supported thereby.

20 Claims, 1 Drawing Sheet

FOLDABLE FRAMEWORK FOR BELT CONVEYOR

RELATED APPLICATIONS

This is a continuation application of U.S. patent application Ser. No. 861,972 filed as PCT/GB90/02013, Feb. 21, 1990, now abandoned.

BACKGROUND

1. Field of The Invention

This invention relates to a foldable framework for supporting a belt conveyor for handling bulk material, and especially a portable or mobile troughed-belt conveyor.

2. Background Art

Troughed-belt conveyors are typically incorporated into processing plants for bulk material (such as coal, soil, gravel and mineral ores), where they are variously used for feeding, transporting, elevating, and stock piling materials around the processing plant. When the processing plant is required to be readily movable from place to place, either around a site or between different sites, it is often found that the lengths of the troughed-belt conveyors render the plant unwieldy and difficult or impossible to move. This is especially the case when plant is to be moved along public road, where there are legal limits to the maximum permissible overall dimensions of vehicles. There is therefore a requirement for a means to enable troughed-belt conveyors to be readily foldable.

Hitherto, portable and mobile processing plant has incorporated foldable conveyors, but such conveyors have often been awkward or dangerous to fold or deploy; they have often needed assistance from a loading shovel or a crane; and they have often been limited to less than optimum deployed lengthy by shortcomings in the folding mechanisms. In other cases, foldable troughed-belt conveyor frameworks have been either excessively complicated, making them expensive and troublesome, or else so ineffectual that they remain bulky and unwieldy even when in their folded positions.

OBJECTS AND SUMMARY OF INVENTION

The present invention therefore seeks to provide an improved design of foldable framework for bulk conveyors.

According to the invention there is provided a foldable framework for supporting a belt conveyor and which comprises:
- a fixed sloping support frame having a base and an upper end;
- a movable support frame connected to an upper end of the fixed frame via a first universal-type connection;
- a primary support leg connected at its lower end to the fixed frame via a second universal-type connection and connected at its upper end to the movable frame; and,
- a power-operated device connected directly or indirectly between the fixed frame and the movable frame and operative to cause the movable frame to pivot about the first universal-type connection between an operative conveyor-support position in co-operation with the fixed support frame and a laterally displaced inoperative position suitable for storage and transport of the framework and a conveyor supported thereby.

The invention therefore provides a novel construction of foldable framework for supporting a bulk conveyor, such as a troughed-belt conveyor, and which is uncomplicated in its construction, and yet which provides for an unusually large ratio between open and closed envelopes. The invention further provides a powered device, such as an hydraulic cylinder, in the foldable framework for folding and deploying the framework, and also provides a structure which is particularly simple to fold and deploy. In the embodiment shown, the power-operated device is mounted on the fixed frame itself.

In a preferred arrangement, the movable frame pivots through an angle of at least 80° about the first universal-type connection between its operative and inoperative positions.

Preferably, an additional supplemental support leg is provided for the movable frame which is connected at its lower end to the fixed frame with a third universal-type connection. The supplemental support leg may comprise a telescopic arrangement which can be locked in an extended position to support the movable frame in its operative position, but which can be unlocked and then caused to shorten its length as the movable frame with the primary support leg is pivoted to the inoperative position under the action of the power-operated device.

The upper ends of the primary support leg, and of the supplemental support legs, also may be connected with universal-type connections at their upper ends to the movable frame.

The universal-type connections provided in the framework according to the invention may comprise any convenient means, such as universal joints, loose fit pivots and elastomeric bearing joints.

In a preferred embodiment, the relative lengths of the movable frame and the primary support leg, and the distances apart and dispositions of the various universal type connections are so arranged that in the deployed position, the fixed frame and the movable frame are constrained to be aligned in end-to-end relationship to form a continuous straight upwardly-sloping conveyor framework the overhanging portion of which is at least partially supported by the primary support leg. As the primary support leg and the movable frame move to the inoperative or folded position, the movable frame is constrained to swing laterally about the first universal-type connection to the fixed frame, and simultaneously rolls about the general longitudinal axis of the moveable frame. When the movable frame reaches the folded position, the movable frame makes an angle of approximately a right angle with the fixed frame, when viewed from above. Simultaneously, the movable frame rolls or is twisted about its general longitudinal axis, also through approximately a right angle relative to the fixed frame. Thus, those faces of the frame which were its sides in the deployed or operative position are now its uppermost and lowermost faces, and that face which comprised the underside of the movable frame in the operative position rolls about the general longitudinal axes of the movable frame to become a side thereof in the operative position.

BRIEF DESCRIPTION OF THE DRAWINGS

One embodiment of foldable framework according to the invention will now be described in detail, by way of example only, with reference to the accompanying drawings, in which.

DESCRIPTION OF THE PREFERRED EMBODIMENT

Figure 1:
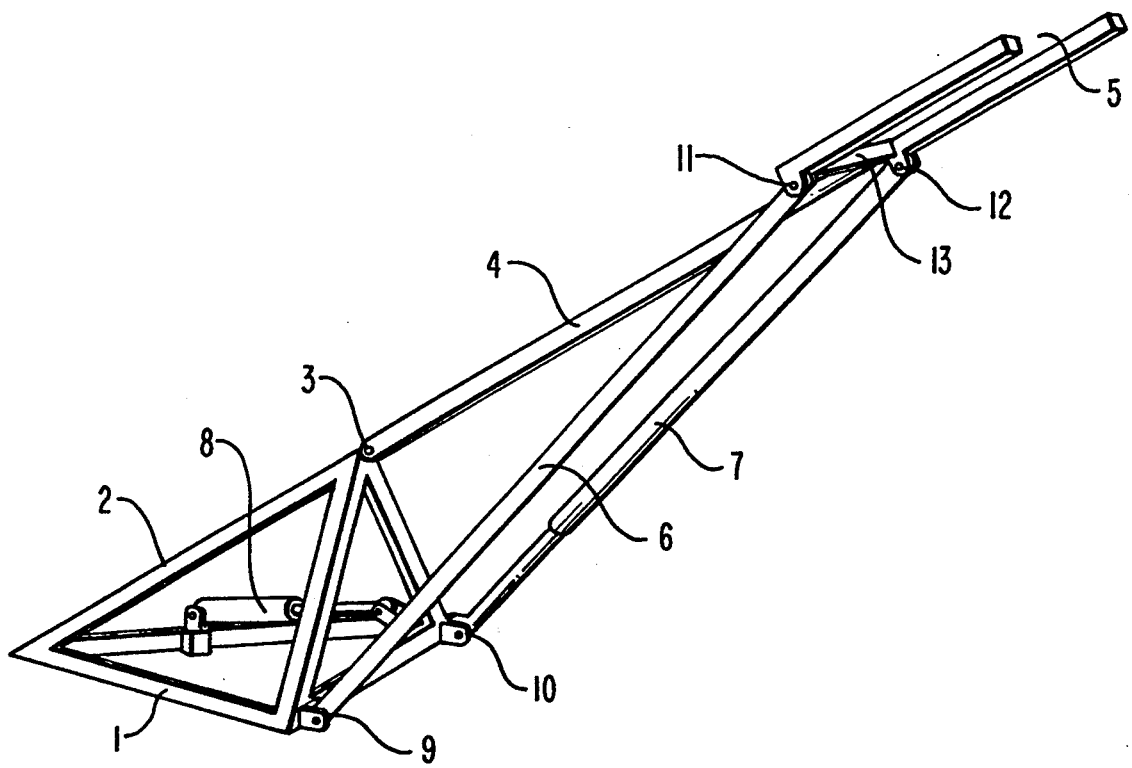
FIG. 1 is a perspective illustration of the frame work in its unfolded, operative position suitable for supporting an inclined belt-type conveyor; and, FIG. 2 is a similar perspective view, but showing the framework in its folded, inoperative position.

Referring now to FIG. 1, there is seen a fixed base framework 1 which rigidly supports a length of sloping conveyor framework 2, at the uppermost end of which is a first universal joint connection 3 by which the uppermost end is connected to a second length of sloping conveyor framework 4. The outer end 5 of the framework 4 is supported and located by a primary support leg 6 and a supplemental support leg, primary support 7, leg 6 being a simple rigid strut member, and supplemental support leg 7 being of telescopic construction. (In the position shown in FIG. 1, leg 7 is fully extended and secured by means of a through-peg not shown). The supporting legs 6 and 7 are connected at their lowermost ends to the base framework 1 by means of second and third universal joints 9 and 10, respectively. An hydraulic cylinder 8 is pivotally connected across third joint 9 between the framework 1 and the primary support leg 6, and forms a power-operated device operable to pivot the movable part of the framework between operative and inoperative conveyor-support positions shown in FIGS. 1 and 2, respectively.

It will be readily apparent that in the operative position shown in FIG. 1, with the hydraulic cylinder 8 and the telescopic supplemental support leg 7 fully extended, the sloping conveyor frameworks 2 and 4 are aligned in end-to-end relationship, and are constrained to slope upwardly towards the furthermost end 5. When equipped with driving and supporting rollers and an endless flexible conveyor belt, this composite framework forms an upwardly sloping conveyor the overhanging portion of which is supported by the legs 6 and 7, in the manner of an inclined tripod.

It should be noted that in the embodiment shown, a cross-beam 13 is rigidly connected to the upper end of conveyor framework 4 in order to space the supporting legs 6 and 7 apart sufficiently to allow the conveyor belt to pass between them. The support legs 6 and 7 are connected at the uppermost ends thereof to opposite ends of cross-boom 13 by fourth and fifth universal joint connections 11 and 12, respectively.

Figure 2:
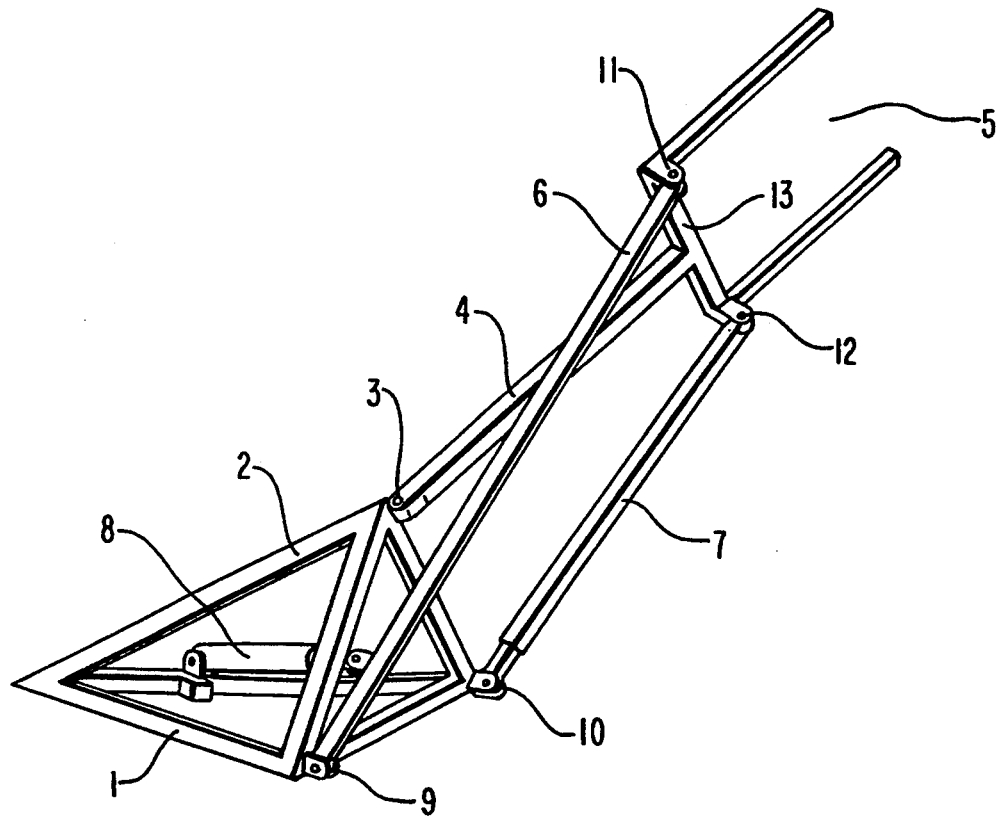

Referring now to FIG. 2, it is seen that in the operative position of the framework the cylinder 8 has been retracted relative to FIG. 1, causing telescopic supplemental support leg 7 similarly to retract. In the process the framework 4 has been constrained by the rigid supporting leg 6 to swing laterally about first universal joint 3 into a foldable position, where framework 4 hangs approximately at right angles to the framework 2 when viewed from above. It is further seen that framework 4 has been constrained by primary support leg 6 to roll or twist about its longitudinal axis through approximately a right angle during its movement from the working, operative position shown in FIG. 1, so that what was previously the underside of the conveyor defined as the plane containing legs 6 and 7, now in FIG. 2 faces outwardly as a side thereof.

In this inoperative position the folded conveyor may be arranged to fit between or around other components of a mobile or portable processing plant in a particularly compact fashion. Thus, it is seen that all of the objectives of the invention are achieved by means of a singularly uncomplicated linkage.

The invention is not limited to the embodiment hereinbefore described. For example, the universal joints 3, 9, 10, 11, and 12 may be constructed as elastomeric bearings, ball joints or as simple hinges or pivots so mounted as to swing about suitable axes; or the hydraulic cylinder 8 may be a different type of actuator, or it may be connected across different components of the linkage. It should also be noted that the telescopic supplemental leg 7 is not fundamental to the invention, and may be omitted entirely from an optional embodiment of the invention.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A foldable framework for supporting a belt conveyor, said framework comprising:
   (a) a fixed sloping support frame having a base and an upper end;
   (b) a moveable support frame connected to said upper end of said fixed frame with a first universal-type connection;
   (c) a primary support leg having an upper end and a lower end, said lower end of said primary support leg being connected to said fixed frame with a second universal-type connection, and said upper end of said primary support leg being connected to said moveable frame; and
   (d) a power-operated device connected directly or indirectly between said fixed frame and said moveable frame, said power-operated device thereby being operative to cause said moveable frame to pivot about said first universal-type connection between an operative conveyor-support position and a laterally-displaced inoperative conveyor-support position suitable for storage and transport of said framework and a conveyor supported thereby.

2. A foldable framework as recited in claim 1, wherein said moveable frame is pivotable through an angle of at least 80° about said first universal-type connection between said operative and said inoperative positions thereof.

3. A foldable framework as recited in claim 1, further comprising a supplemental support leg having an upper end and a lower end, said supplemental support leg being connected at said upper end thereof to said moveable frame and being connected at said lower end thereof to said fixed frame with a third universal-type connection.

4. A foldable framework according to claim 3, wherein said supplemental support leg comprises a telescopic structure capable of being locked in an extended position to support said moveable frame in said operative position thereof, said telescopic structure being further capable when unlocked of being caused to shorten the length thereof relative said extended position as said moveable frame is pivoted from said operative position to said inoperative position thereof.

5. A foldable framework as recited in claim 3, wherein said upper end of said primary support leg and said upper end of said supplemental support leg are connected with respective fourth and fifth universal-type connections to said moveable frame.

6. A foldable framework as recited in claim 1, wherein said first and second universal-type connections comprise universal joints.

7. A foldable framework as recited in claim 1, wherein said first and second universal-type connections comprise loose fit pivots.

8. A foldable framework as recited in claim 1, wherein said first and second universal-type connections comprise elastomeric bearing joints.

9. A foldable framework as recited in claim 1, wherein the relative lengths of said moveable frame and said primary support leg, and the separation distances between and the dispositions of said first and second universal-type connections are such that:

(a) in said operative position of said moveable frame said fixed frame and said moveable frame are constrained in end-to-end alignment, thereby to form a continuous, straight upwardly-sloping conveyor framework having an overhanging portion that is at least partially supported by said primary support leg; and (b) in said inoperative position of said moveable frame, said moveable frame when viewed from above making an angle with said fixed frame, and in said inoperative position said moveable frame being rolled about the general longitudinal axis thereof relative to said movable frame in said operative position thereof.

10. A foldable frame work as recited in claim 9, wherein in said inoperative position of said movable frame when viewed from above, said movable frame makes an angle of approximately a right angle with said fixed frame, and wherein relative to the position of said moveable frame in said operative position thereof said moveable frame in said inoperative position thereof is rolled about the general longitudinal axis thereof through approximately a right angle, thereby to rotate that face of said moveable frame which comprises the underside of the movable frame in said operative position thereof about said general longitudinal axis of said moveable frame into a position as a side thereof in said inoperative position.

11. A foldable frame work as recited in claim 1, wherein the relative lengths of said moveable frame and said primary support leg, and the separation distances between and the dispositions of said first and second universal-type connections are such that as said primary support leg and said movable frame pivot from said operative position of said moveable frame to said inoperative position thereof, said moveable frame both:

(a) swings laterally about said first universal-type connection; and (b) rolls about the general longitudinal axis of said moveable frame.

12. A foldable framework as recited in claim 1, wherein said power-operated device comprises an hydraulic cylinder.

13. A foldable framework according to claim 1, wherein said power-operated device is mounted on one of said fixed frame and said moveable frame.

14. A foldable frame as recited in claim 13, wherein said power-operated device is mounted on said fixed frame.

15. A foldable framework as recited in claim 3, wherein said third universal-type connections comprise universal joints.

16. A foldable framework as recited in claim 3, wherein said third universal-type connections comprise loose fit pivots.

17. A foldable framework as recited in claim 3, wherein said third universal-type connections comprise elastomeric bearing joints.

18. A foldable framework as recited in claim 5, wherein said fourth and fifth universal-type connections comprise universal joints.

19. A foldable framework as recited in claim 5, wherein said fourth and fifth universal-type connections comprise loose fit pivots.

20. A foldable framework as recited in claim 5, wherein said fourth and fifth universal-type connections comprise elastomeric bearing joints.

* * * * *

UNITED STATES PATENT AND TRADEMARK OFFICE
CERTIFICATE OF CORRECTION

PATENT NO. : 5,333,725
DATED : August 2, 1994
INVENTOR(S) : PATRICK J. DOUGLAS

It is certified that error appears in the above-indentified patent and that said Letters Patent is hereby corrected as shown below:

Column 1, line 38, "lengthy" should be --length--
    Column 2, line 44, "upwardly-sloping" should be --upwardly sloping--
    Column 4, line 46, "laterally-displaced" should be --laterally displaced--
    Column 5, line 25, "upwardly-sloping" should be --upwardly sloping--
    Column 6, lines 18-19, "an hydraulic-- should be --a hydraulic--

Signed and Sealed this

Seventh Day of March, 1995

Attest:

BRUCE LEHMAN

*Attesting Officer*     *Commissioner of Patents and Trademarks*